United States Patent
Löbert et al.

(10) Patent No.: US 6,793,249 B2
(45) Date of Patent: Sep. 21, 2004

(54) SAFETY BELT APPARATUS

(75) Inventors: Amrei Löbert, Langenau (DE); Andreas Wengert, Mutlangan (DE); Roland Schnabl, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 83 days.

(21) Appl. No.: 09/983,323

(22) Filed: Oct. 24, 2001

(65) Prior Publication Data

US 2002/0084645 A1 Jul. 4, 2002

(30) Foreign Application Priority Data

Oct. 24, 2000 (DE) .......................... 100 52 688

(51) Int. Cl.⁷ .............................................. B60R 22/42
(52) U.S. Cl. ...................................... 280/806; 280/807
(58) Field of Search ................................ 280/806, 807, 280/805, 804; 297/480

(56) References Cited

U.S. PATENT DOCUMENTS

| | | | | |
|---|---|---|---|---|
| 4,323,204 A | * | 4/1982 | Takada | 242/381.4 |
| 4,597,586 A | | 7/1986 | Burghardt et al. | |
| 4,615,540 A | * | 10/1986 | Sedlmayr et al. | 280/806 |
| 4,647,071 A | * | 3/1987 | Tabata | 280/806 |
| 4,772,046 A | | 9/1988 | Salomonsson et al. | |
| 4,840,325 A | | 6/1989 | Higuchi et al. | |
| 5,004,178 A | * | 4/1991 | Kobayashi et al. | 242/381.1 |
| 5,029,896 A | * | 7/1991 | Ernst | 280/806 |
| 5,039,127 A | * | 8/1991 | Fohl | 280/806 |
| 5,295,714 A | * | 3/1994 | Fohl | 280/806 |
| 5,316,339 A | * | 5/1994 | Lorenz | 280/806 |
| 5,323,977 A | * | 6/1994 | Frei et al. | 242/381.1 |
| 5,326,043 A | * | 7/1994 | Yamanoi | 242/396.5 |
| 5,340,152 A | * | 8/1994 | Fohl | 280/805 |
| 5,344,096 A | * | 9/1994 | Frei et al. | 242/379 |
| 5,346,152 A | | 9/1994 | Fohl | |
| 5,350,195 A | * | 9/1994 | Brown | 280/806 |
| 5,358,276 A | * | 10/1994 | Lane, Jr. | 280/806 |
| 5,415,431 A | * | 5/1995 | Omura | 280/805 |
| 5,423,598 A | * | 6/1995 | Lane et al. | 297/479 |
| 5,531,479 A | | 7/1996 | Bauer | |
| 5,547,222 A | * | 8/1996 | Schmidt | 280/801.2 |
| 5,660,346 A | * | 8/1997 | Dick | 242/376.1 |
| 5,704,638 A | * | 1/1998 | Lane, Jr. | 280/730.2 |
| 6,155,727 A | * | 12/2000 | Wier | 297/480 |

FOREIGN PATENT DOCUMENTS

| | | |
|---|---|---|
| DE | 3600650 A1 | 7/1987 |
| GB | 2 157 152 A | 10/1985 |

* cited by examiner

*Primary Examiner*—Paul N. Dickson
*Assistant Examiner*—Deanna Draper
(74) *Attorney, Agent, or Firm*—Foley & Lardner LLP

(57) ABSTRACT

A safety belt apparatus for motor vehicles. The apparatus includes a safety belt and a belt tensioner which can be mounted to the vehicle in the region of a free belt section and which cooperates with the safety belt in the region of the free belt section to alter the effective length of the safety belt.

15 Claims, 2 Drawing Sheets

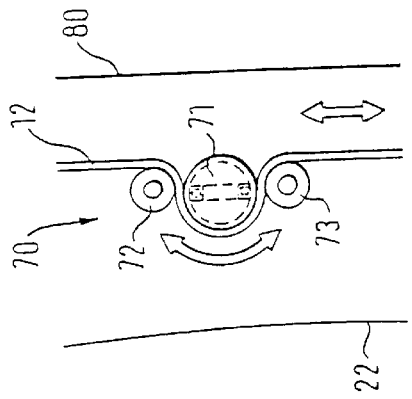
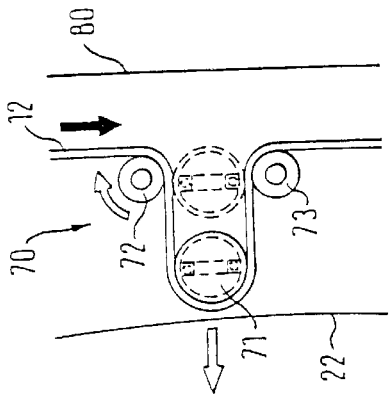
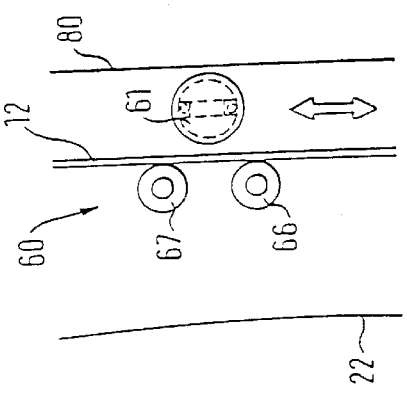
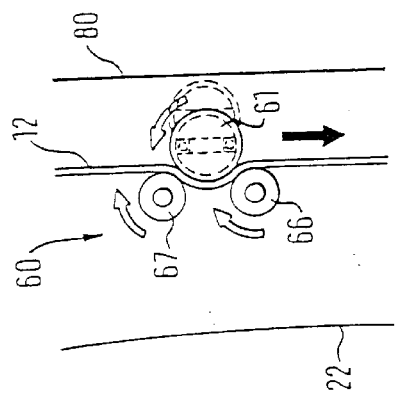
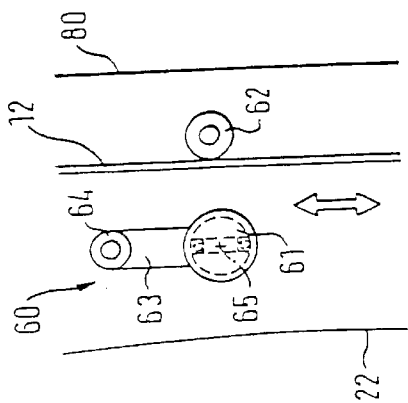
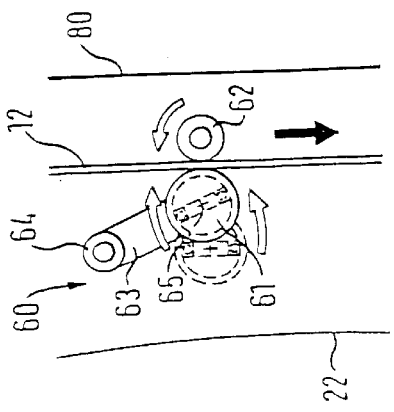

SAFETY BELT APPARATUS

BACKGROUND OF THE INVENTION

The invention relates to a safety belt apparatus for motor vehicles comprising a safety belt and a belt tensioner.

Belt tensioners ensure that in the event of an accident the safety belt contacts the body of the respective occupant tightly and that the protective effect of the safety belt is optimized.

SUMMARY OF THE INVENTION

According to the present invention, a safety belt apparatus that accomplishes a reliable tensioning of the safety belt is provided. In particular, the apparatus provides a tensioning as independent as possible of other means of the safety belt apparatus.

The apparatus may include a belt tensioner attachable to the vehicle in the region of a free belt section. The belt tensioner cooperates with the safety belt in the region of the free belt section to alter the effective length of the safety belt. Since the belt tensioner is attachable in the region of a free belt section and cooperates with the safety belt in the region of this free belt section, the belt tensioning can take place independently of other means of the safety belt apparatus. The non-dependence on other parts of the apparatus offers the advantage that the belt tensioner can be subsequently integrated in existing safety belt apparatuses and can be made available as a retrofitting kit. The effective length of the safety belt at the occupant vehicle can be altered independently of a belt tensioner.

A further advantage of the present invention is that the effective length of the safety belt, that is the section of the safety belt between the belt tensioner and the buckle which restrains the vehicle occupant in the event of an accident, is not only reduced, but can also be extended in a defined manner. The contact pressure of the safety belt on the occupant of the vehicle can thus be set directly. A control device can be provided for adjusting the effective length of the safety belt. The length can be set in the normal operation of the vehicle in accordance with a pre-set contact pressure, which can, for example, be selected by the vehicle occupant himself. Appropriate measuring devices can be provided to measure a value corresponding to the contact pressure, e.g. the belt tension or a force applied to a further component via the belt in order to provide safety belt apparatus with a "comfort function."

Moreover, the present invention provides an optimum protection against a so-called "second impact", in which the vehicle is exposed to a second impact subsequent to a first impact. Such a second impact occurs, for example, when the vehicle drives through an obstacle (first impact) and is brought to a halt in a subsequent second impact. The belt tensioner can furthermore be deliberately used, independently of other means of the safety belt apparatus, for the purpose of positioning the vehicle occupant prior to the second impact such that the safety belt can again develop its optimum protective effect. Moreover, the belt tensioning in accordance with the present invention can be designed such that existing occupant restraining systems of the vehicle are reinforced or complemented in their protective effect, in particular, with respect to the second impact protection.

Another embodiment of the present invention includes a belt tensioner comprising a clamping unit which is steerable starting from a rest position into clamping engagement with the safety belt. The cooperation between the belt tensioner and the safety belt is effected by clamping of the respective belt section so that the clamped belt section can be moved to alter the effective length of the safety belt in the desired manner, i.e. the safety belt contacts the body of the vehicle occupant in a more or less tight manner.

In a further embodiment of the present invention, the path of the safety belt is altered by the belt tensioner. The path of the safety belt, and thus the effective length of the safety belt, can be directly set, for example, by forming a loop in the belt which can be changed in size.

In accordance with a further preferred embodiment, the belt tensioner can be moved along the belt section. Substantially linear movement of the belt tensioner can be utilized in order to steer a clamping unit of the belt tensioner into clamping engagement with the safety belt. The non-dependence of the apparatus in accordance with the invention on other vehicle means is realized by the belt tensioner utilizing its own movability.

In a further embodiment of the invention, the belt tensioner includes a control unit which can be driven directly to make a movement along the belt section and via which the clamping unit can be steered into clamping engagement with the safety belt. Preferably the clamping unit can be moved together with the control unit, with a lag with respect thereto, along the belt section. The clamping unit can be coupled to the control unit such that the lag of the clamping unit is the result of inertia. The lag is utilized to steer the clamping unit into clamping engagement with the safety belt. After activation of the belt tensioner drive, the control unit is set in motion and this motion is converted into the clamping movement of the clamping unit. The clamping unit is thereby brought into clamping engagement with the safety belt. The clamping unit and the clamped safety belt are subsequently moved together with the control unit, whereby the desired belt tensioning is achieved.

The clamping unit can comprise at least one clamping member which is provided with a control surface at its side remote from the safety belt which can be acted upon by a control section of the control unit. Preferably, the clamping member is formed as a clamping wedge and the control section as a correspondingly shaped cooperating wedge.

The clamping unit preferably comprises at least two oppositely disposed clamping members which can be moved toward one another by movement of the belt tensioner. The clamping members serve as clamping jaws between which the safety belt can be clamped. The clamping members can be formed as identically designed clamping wedges which are arranged symmetrically with respect to the safety belt and which are each provided at their side remote from the safety belt with an oblique surface extending at an angle with respect to the direction of movement of the control unit.

Alternatively, the belt tensioner can comprise at least two clamping reels which can be moved relative to one another in order to form a clamping gap for the safety belt, with at least one clamping reel being provided with a rotary drive.

To alter the effective length of the safety belt, the safety belt is first clamped between the two clamping reels, which can be moved accordingly for this purpose, with the clamping reel provided with the rotary drive being subsequently set into rotation in order to transport the safety belt through the clamping gap. The direction, the degree and the speed of the alteration in length can be deliberately set with high precision.

In accordance with a further embodiment of the present invention, the belt tensioner can comprise at least two guide reels around which the safety belt is guided and which can be moved relative to one another to alter the path of the safety belt in order to adjust the effective length of the safety belt by altering its path.

The path of the safety belt guided round the guide reels and guided in a compulsory manner and may be pre-set in any relative position of the guide reels.

The belt tensioner is preferably located along a free belt section of the safety belt. In the free belt section, the belt is not constrained or in contact with other parts such as, for example, winding reels, anchors, buckles and guides. The free belt section having the belt tensioner may be located between a belt winding reel and a belt deflector or a guide device for the belt. In a safety belt apparatus in which no belt deflector and no belt guide is provided, the belt tensioner is preferably arranged in the free belt section located between a belt winding reel and the level of the shoulder of the respective occupant.

It is particularly preferred if the belt tensioner is mounted in the region of the B or C pillar of the vehicle, in particular within the B or C pillar. Alternatively, it is also possible to arrange the belt tensioner in the region of the rear shelf, in particular beneath the rear shelf of the vehicle.

Preferably, the present invention provided a belt tensioner that can be moved out of a rest position against the restoring force of a restoring means, in particular of a return spring. For example, a clamping of the safety belt or a previously set path of the safety belt corresponding to a certain effective length of the safety belt can be cancelled or altered again in a simple manner. A reversible system is thereby created.

The belt tensioner preferably comprises a separate drive, in particular, in the form of an electric motor.

The belt tensioner can be designed to ideally achieve the protective function intended for it independently of other means of the vehicle.

The present invention relates to a belt tensioner for motor vehicles which can be mounted to the vehicle in the region of a free belt section and which cooperates with the safety belt in the region of the free belt section in order to alter the effective length of the safety belt. The belt tensioner may be formed as a retrofitting kit which can be subsequently integrated in a safety belt apparatus of the vehicle. The belt tensioner can be designed such that the structure of the vehicle is used.

It is to be understood that both the forgoing general description and the following detailed description are exemplary and explanatory only, and not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 2A is a schematic view of an embodiment of a belt tensioner according to the present invention.

FIG. 2B is a schematic view of the belt tensioner of FIG. 2A during activation of the belt tensioner.

FIG. 3A is a schematic view of an alternative embodiment of a belt tensioner according to the present invention.

FIG. 3B is a schematic view of the belt tensioner of FIG. 3A during activation of the belt tensioner.

FIG. 4A is a schematic view of another alternative embodiment of a belt tensioner according to the present invention.

FIG. 4B is a schematic view of the belt tensioner of FIG. 4A during activation of the belt tensioner.

DETAILED DESCRIPTION OF THE DRAWINGS

Figure 1:
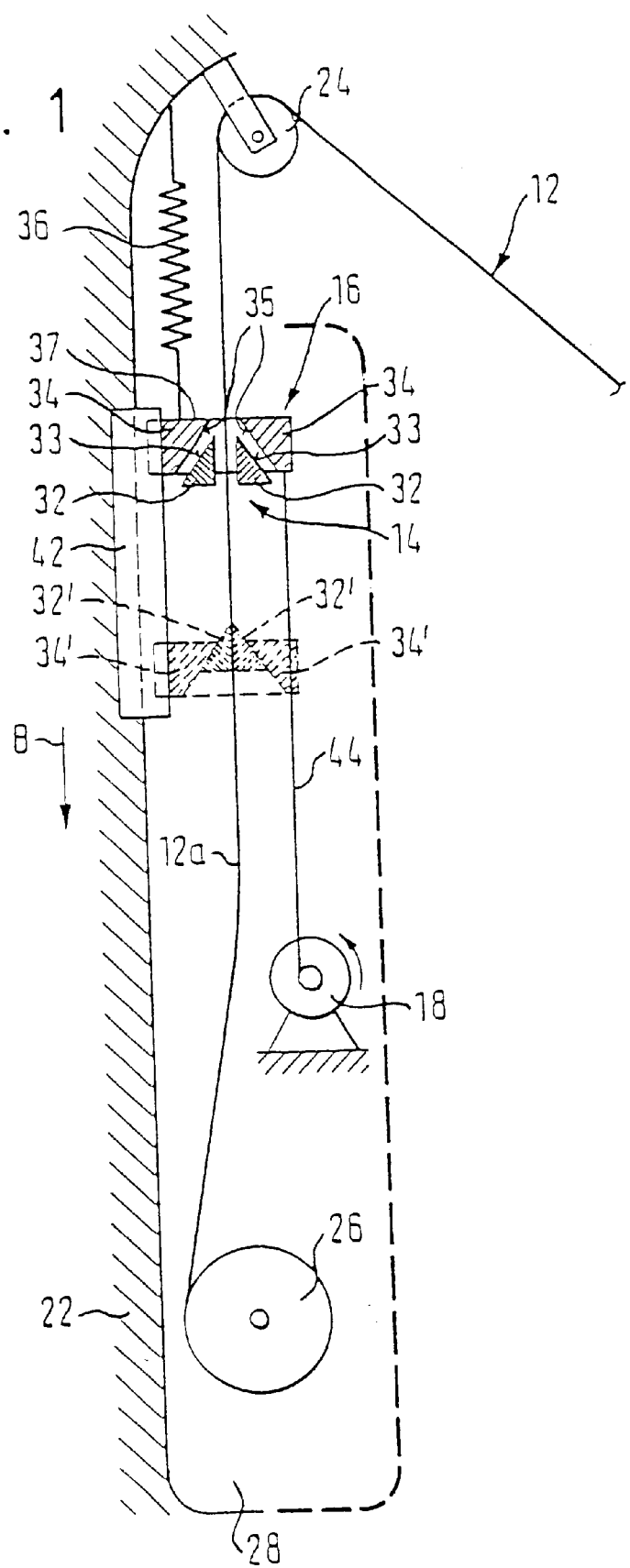
FIG. 1 is a schematic side view of a side panel of a motor vehicle including a seat belt apparatus according to the present invention.

A side panel 22 of a motor vehicle in the region of the B pillar 28 is shown schematically in FIG. 1. A safety belt apparatus, for example for the driver of the motor vehicle, comprises a safety belt 12, a deflector 24 and a winding reel 26.

A belt tensioner is arranged between the deflector 24 and the winding reel 26 and comprises a clamping unit 14, a control unit 16 and a drive 18. In FIG. 1, the belt tensioner is shown by solid lines in an upper rest position in which the safety belt 12 can be moved without obstacle between two clamping wedges 32 of the clamping unit 14. The wedges 32 serve as clamping jaws and are arranged spaced apart from one another in the rest position.

The control unit 16 comprises two control sections 34 that cooperate with the clamping members 32 of the clamping unit 14 as described in more detail below. The control sections 34 are coupled to a guide device 42 at the side panel 22 of the vehicle. The guide 42 can have any form in principle. However, the guide is preferably formed as a guide strip, guide rod or guide rail, for example. The control unit 16 can be moved downwardly in the direction of the arrow B by means of the drive 18, with the control unit 16 being guided in linear manner by the guide device 42. The control unit 16 may move parallel along the vehicle side panel 22 along the belt section 12a extending between the deflector 24 and the winding reel 26.

The drive 18 comprises an electric motor for operating a winding mechanism for a drive means 44 (preferably in the form of a rope or belt) fastened to a housing 37 of the control unit 16. The housing 37 surrounds the clamping unit 14 and the safety belt 12. The drive 18 is an electrical linear drive for the belt tensioner which thereby provides a linear tensioning of the safety belt 12.

A motorized gear, for example, may alternatively be provided as the electrical linear drive of the belt tensioner and can cooperate with a rack mounted to the housing 37 of the control unit 16.

The movement of the control unit 16 from the upper rest position (shown in FIG. 1 as solid lines) in the direction of the arrow B is made against the restoring force of a return spring 36. The spring 36 has one end fastened to the control unit 16 or its housing 37 and has another end fastened to the side panel of the vehicle 22 or the transition region between the side panel 22 and the vehicle roof.

The clamping unit 14 includes clamping jaws 32 that are movably supported at the control unit 16 or in the housing 37 such that they can be moved toward one another in order to be brought into clamping engagement with the safety belt 12. In order to ensure a spacing between the clamping surfaces of the clamping wedge 32 facing each other sufficient for an unhindered pulling out and winding up of the safety belt 12, the clamping unit 14 can be provided with a spring mechanism which presses apart the clamping wedges 32 utilizing a pre-set bias force.

The clamping members 32 are movably supported in the direction of movement B of the control unit 16 and relative thereto such that a movement of the control 16 from the rest position effected by the drive 18 is not initially transmitted to the clamping members 32. The clamping members 32 remain in the starting upper rest position due to their inertia until they are directly acted upon by the control sections 34 of the downwardly moved control unit 16.

A spring mechanism can be provided between the control sections 34 and the clamping members 32 which act in the direction of movement B and which hold the clamping unit 14 and the control unit 16 spaced in the rest position.

The clamping members 32 are arranged symmetrically with respect to the plane defined by the belt section 12*a*. Each of the clamping members 32 are similarly shaped and are provided with an oblique surface 33 at their side remote from the belt. The oblique surface 33 extends at an inclination to the direction of movement B of the control unit 16 and serves as a control surface. The control sections 34 of the control unit 16 are formed as cooperating wedges for the clamping wedges 32 and each have a correspondingly inclined control surface 35. The control sections 34 are spaced apart a constant amount in a direction perpendicular to the direction of movement B. The clamping members 32 are consequently moved toward one another into clamping engagement with the belt section 12*a* by the downward movement of the control sections 34. The linear movement of the control unit 16 is converted into a clamping movement of the clamping unit 14 perpendicular thereto by the cooperating inclined surfaces.

As soon as the clamping surfaces of the clamping members 32 are pressed against one another with the safety belt 12 between them, the clamping members 32 are moved further downwardly together with the control unit 16. In FIG. 1, the end position of the clamping members 32' and the control sections 34' is represented by broken lines.

The safety belt 12 clamped in this way is taken along in a downward direction via the downwardly moving clamping members 32, which at the same time are pressed against one another, whereby the desired belt tensioning is achieved.

In accordance with the invention, the clamping force of the clamping unit 14 becomes active with a lag with respect to the start of movement of the control unit 16. The time lag is determined by the time which passes until the clamping members 32 are directly acted upon by the control sections 34, moved toward one another and pressed against one another with a sufficiently large force.

Alternatively, it is also possible to arrange the control unit 16 and the clamping unit 14 in the rest position such that the control surfaces 33, 35 contact one another when the device is in the rest position. In this case, the clamping movement of the clamping members 32 extending perpendicularly to the direction of movement B is initiated immediately after the activation of the drive 18.

The time during which the drive 18 is active and holds the belt tensioner in the active position with the safety belt 12 clamped and thus tensioned between the clamping members 32 can be deliberately set independently of other means of the vehicle including, for example, the belt reel 26. As a result, the respective vehicle occupant is reliably restrained in the vehicle seat even in the case of a further impact (second impact) following a first impact triggering the drive 18.

As soon as the force driving the control unit 16 downwardly is no longer active after the de-activation of the drive 18 or the uncoupling from the drive 18, the control unit 16, and with it the clamping unit 14, is again returned to the upper rest position by the reset mechanism 36. During reset, the clamping members 32 come out of engagement with the safety belt 12, which can thus be pulled out again without hindrance so that the vehicle occupant can undo the safety belt 12.

The belt tensioner is a reversible system having an original starting state that can be restored after a belt tensioning has been carried out.

The lag with which the belt tensioning is carried out after the triggering of the drive 18 can be deliberately set by the speed with which the drive 18 becomes active and by the speed with which the control unit 16 is moved downwardly. Moreover, the lag can be influenced by a corresponding selection of the spacing present in the direction of movement B between the control sections 34 and the clamping members 32 and of the spacing between the clamping surfaces of the clamping members 32 facing one another in a direction perpendicular to the direction of movement B.

In FIGS. 2–4, FIGS. 2A, 3A and 4A correspond to normal operation in which the safety belt 12 can be pulled from a belt winding reel (not shown) and wound up on it unhindered by the belt tensioner 60, 70A. FIGS. 2B, 3B, and 4B correspond to the state with the active belt tensioner 60, 70.

In an embodiment shown in FIGS. 2A and 2B, the belt tensioner 60 comprises two clamping reels 61, 62. One clamping reel 61 is mounted to one end of a pivot arm or rocker arm 63 which is freely pivotable around an axis 64 at its other end. The one clamping reel 61 is associated with a rotary drive (not shown), for example, in the form of an electric motor, with which the reel 61 can be set into rotation around an axis 65. The other clamping reel 62 is freely rotatable.

The starting position of the belt tensioner 60 is shown in FIG. 2A in which the safety belt 12 can be moved freely to and fro between the clamping reels 61, 62, as is indicated by the double arrow. The pulling out and winding up of the safety belt 12 from or with the reel is not affected by the belt tensioner 60 in the starting position.

The belt tensioner 60 is designed so that when the rotary drive is activated and the rotation of the clamping reel 61 starts, the pivot arm 63 is deflected in the direction of the other clamping reel 62, as is shown in FIG. 2B, due to the moment generated thereby. The safety belt 12 is thereby clamped between the two clamping reels 61, 62 and transported through the clamping gap formed by the reels 61, 62 in accordance with the direction of rotation of the drive reel 61.

In the embodiment shown in FIGS. 3A and 3B, the clamping reel 61 is provided with a rotary drive that can be moved in a direction perpendicular to the path of the safety belt 12. The reel 61 can thereby be moved out of the starting position in accordance with FIG. 3A against two freely rotatably clamping reels 66, 67 spaced along the safety belt 12. Two clamping gaps for the safety belt 12 are formed through which the safety belt 12 is transported as soon as the drive reel 61 is set into rotation, as is indicated by the arrows in FIG. 3B.

In the embodiment shown in FIG. 4A, an alteration is made to the effective length of the safety belt 12 by altering its path in the region of the belt tensioner 70. For this purpose, three freely rotatable guide reels 71, 72, 73 are provided around which the safety belt 12 is wound and which form a compulsory guide for the safety belt 12.

The guide reel 71 is movable relative to the two stationary guide reels 72, 73 perpendicular to the actual longitudinal extent of the safety belt 12. A loop of variable size can be formed in the safety belt 12 by adjusting the guide reel 71 so that the effective length of the safety belt 12 can be set as appropriate by setting a certain relative position of the guide reels 71, 72, 73. The belt tensioning indicated by the dark arrow in FIG. 4B is carried out by the guide reel 71 in FIG. 4A being moved to the left with the belt reel (not shown) locked.

Furthermore, a so-called comfort function can be advantageously realized with the belt tensioner 70 shown in FIGS. 4A and 4B during the normal operation of the vehicle. The position of the guide reel 71 is set according to a pre-set contact pressure of the safety belt 12 at the respective vehicle occupant, this contact pressure may be determined by a suitable sensor system and be transmitted to a control device formed to control the guide reel 71. The embodiment in accordance with FIGS. 4A and 4B can, however, also be realized without a comfort function.

The belt tensioner in accordance with the invention is preferably provided in the form of a compact unit and accommodated within a, for example, box-shaped housing adapted to the structure of the respective vehicle. The housing 80 mounted in the region of a side panel 22 of the vehicle is indicated in FIGS. 2–4.

The positioning of the belt tensioner is not restricted to the B pillar and can also be made, for example, in the region of the C pillar of the vehicle. Alternatively, the belt tensioner could also be arranged in the region of the rear shelf.

Another important advantage of the belt tensioner in accordance with the invention lies in the fact that it can be subsequently integrated into the vehicle, for example into its B or C pillar 28 or at another position and that thus existing safety belt apparatuses can be retrofitted.

The priority application DE 100 52 688.8 is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A safety belt apparatus for motor vehicles comprising
a safety belt and
a belt tensioner mounted to the vehicle adjacent to an exposed portion of the safety belt and
wherein the belt tensioner is configured to cooperate with the exposed portion of the safety belt to alter an effective length of the safety belt
wherein the belt tensioner includes a control unit configured to move along the safety belt, wherein movement of the control unit forces a clamping unit of the belt tensioner to move into clamping engagement with the safety belt;
wherein the control unit and the clamping unit are arranged so that a second time when movement of the clamping unit begins as a result of movement of the control unit lags a first time when movement of the control unit begins.

2. An apparatus in accordance with claim 1, wherein the belt tensioner is configured to alter the path of the safety belt.

3. An apparatus in accordance with claim 1, further comprising a guide operatively connected to the belt tensioner, wherein the belt tensioner is movable along the guide adjacent a side panel of the vehicle.

4. An apparatus in accordance with claim 1, wherein the clamping unit includes at least one clamping member having with a control surface facing generally away from the safety belt configured to be acted upon by a control section of the control unit.

5. An apparatus in accordance with claim 4, wherein the control surface is configured as an oblique surface extending with an angle with respect to the direction of movement of the control unit.

6. An apparatus in accordance with claim 4, wherein the clamping member is configured as a wedge, and wherein a control section of the control unit is configured to be a cooperating wedge for the clamping member.

7. An apparatus in accordance with claim 1, wherein the clamping unit has at least two oppositely disposed clamping members which can be moved toward one another by movement of the belt tensioner.

8. An apparatus in accordance with claim 1, wherein the belt tensioner includes a return spring positioned so that the force of the spring opposes movement of the clamping unit to engage the belt.

9. An apparatus in accordance with claim 1, wherein the belt tensioner is configured to be mounted within the B or C pillar of the vehicle.

10. The apparatus of claim 1, wherein the control unit and clamping unit are positioned so that, prior to movement of the control unit in a direction to force the clamping unit to clamp the belt, the control unit and clamping unit are not in contact.

11. A safety belt apparatus for motor vehicles comprising:
a safety belt; and
a belt tensioner mounted to the vehicle;
wherein the belt tensioner is configured to cooperate with the safety belt to alter an effective length of the safety belt;
wherein the belt tensioner comprises at least two clamping reels configured to move relative to one another to form a clamping gap for the safety belt, wherein at least one clamping reel includes a rotary drive.

12. An apparatus in accordance with claim 11, wherein the drivable clamping reel is mounted to a pivotable arm, wherein an axis of rotation of the drivable clamping reel is parallel to a pivot axis of the pivotable arm.

13. A belt tensioner for a motor vehicle having a safety belt, wherein the tensioner is configured to be mounted to the vehicle adjacent to an exposed portion of the safety belt wherein the belt tensioner comprises at least two clamping reels configured to move relative to one another to thereby clamp the safety belt therebetween, wherein the belt tensioner includes a rotary drive for one of the clamping reels.

14. A belt tensioner in accordance with claim 13, wherein the tensioner is configured as a retro-fitting kit which can be integrated into an installed safety belt apparatus.

15. An apparatus in accordance with claim 13, wherein the belt tensioner is configured to be mounted within the B or C pillar of the vehicle.

\* \* \* \* \*